(12) United States Patent
Montfort et al.

(10) Patent No.: US 7,587,803 B2
(45) Date of Patent: Sep. 15, 2009

(54) METHOD FOR ASSEMBLING A CAMERA MODULE (75) Inventors: Vincent Johannes Jacobus Montfort, Heerlen (NL); Fransiscus Gerardus Coenradus Verweg, Heerlen (NL)

(73) Assignee: TPO Displays Corp., Chu-Nan (TW)

( * ) Notice: Subject to any disclaimer, the term of this patent is extended or adjusted under 35 U.S.C. 154(b) by 717 days.

(21) Appl. No.: 10/529,181

(22) PCT Filed: Sep. 26, 2003

(86) PCT No.: PCT/IB03/04253

§ 371 (c)(1),
(2), (4) Date: Mar. 24, 2005

(87) PCT Pub. No.: WO2004/030346

PCT Pub. Date: Apr. 8, 2004

(65) Prior Publication Data

US 2006/0042064 A1    Mar. 2, 2006

(30) Foreign Application Priority Data

Sep. 30, 2002    (EP) .................................. 02079111

(51) Int. Cl.
*B23Q 17/00* (2006.01)
*B23P 21/00* (2006.01)
*H05K 3/30* (2006.01)
*G01B 11/26* (2006.01)
*G03B 17/00* (2006.01)

(52) U.S. Cl. .................. 29/407.1; 29/407.04; 29/709; 29/833; 356/139.04; 356/139.05; 396/529

(58) Field of Classification Search ................. 29/407.1, 29/407.04, 709, 739, 771, 833; 348/374, 348/188; 356/139.03, 139.04–5, 139.07–8; 396/529; 702/116
See application file for complete search history.

(56) References Cited

U.S. PATENT DOCUMENTS

| | | | | |
|---|---|---|---|---|
| 6,384,397 | B1 * | 5/2002 | Takiar et al. | 250/208.1 |
| 6,541,284 | B2 * | 4/2003 | Lam | 438/7 |
| 7,333,147 | B2 * | 2/2008 | Adachi et al. | 348/374 |
| 2002/0034022 | A1 | 3/2002 | Nakamura | |
| 2005/0237418 | A1 * | 10/2005 | Sakamoto | 348/340 |

FOREIGN PATENT DOCUMENTS

JP    2001-036799    2/2001
WO   01/91193       11/2001

* cited by examiner

*Primary Examiner*—David P Bryant
*Assistant Examiner*—Alexander P Taousakis
(74) *Attorney, Agent, or Firm*—Liu & Liu (57) ABSTRACT A process for assembling a camera module comprises the following steps:—placing the substrate (10) on a positioning die (70);—irradiating the lens assembly (30) with parallel rays of light (90);—displacing a lens assembly (30) comprising the convex lens (33) in an axial direction;—measuring the light intensity of light passing through a spot hole (75) by means of a light sensor (80) being accommodated in the positioning die (70);—determining an optimal axial position of the lens assembly (30) on the basis of an obtained light intensity curve;—bringing the lens assembly (30) to the optimal axial position;—removing the positioning die (70); and—attaching an image sensor chip to a bottom surface (12) of the substrate (10).

10 Claims, 5 Drawing Sheets

METHOD FOR ASSEMBLING A CAMERA MODULE

The present invention relates to a method for assembling a camera module, especially a camera module for a mobile phone or any other relatively small camera module. In such a camera module, dimensions of the camera elements are in the millimeter range, whereas allowable tolerances are in the micrometer range. It is therefore very important that the camera elements are accurately positioned with respect to each other.

The camera module comprises a substrate, a lens and an image sensor chip being attached to the substrate. Rays of light which pass the lens are received by a light-sensitive surface of the image sensor chip. It is important that the lens is aligned very accurately with respect to the light-sensitive surface in x, y and z-directions, wherein the z-direction is defined as a direction perpendicular to the light-sensitive surface, and wherein the x, y-directions are defined as mutually perpendicular, both the x-direction and the y-direction extending parallel to the light-sensitive surface. In relation to the alignment in the z-direction, it is important that the light-sensitive surface of the image sensor chip is positioned at the focus of the lens, in order to obtain a sharp image.

In practice, the optical performance of a camera module may appear to be poor. In many cases, this is the result of the light-sensitive surface of the image sensor chip not being positioned exactly at the focus. Therefore, the present invention relates particularly to a method for assembly with a view to achieving alignment in z-direction.

In the camera module, the lens is part of a lens assembly, which is supported by a carrier being attached to the substrate. According to the state of the art, in the process of assembling the camera module, the image sensor chip is provided on the substrate first. Subsequent to the step of providing electrical connections the image sensor chip, the carrier is attached to the substrate, whereupon the lens assembly is positioned and attached to the carrier. Positioning of the lens assembly takes place by using the image sensor chip, wherein the lens assembly is moved towards the substrate and wherein at discrete intervals, the sharpness of the image being generated by the image sensor chip is checked. Once the lens assembly appears to have the right position, the lens assembly is attached to the carrier.

In practice, checking of the sharpness of the image being generated by the image sensor chip is performed visually by a human operator, wherein the operator looks at the image on a screen and decides the point at which the image has optimum quality. Thus, the checking process needs to be performed by specially trained people, which causes the positioning process to be relatively expensive. Nevertheless, it will be understood that due to human errors of judgement, in a certain percentage of the manufactured camera modules, the light-sensitive surface of the image sensor chip is not exactly positioned at the focus of the lens or is not within a tolerable range of the focus. As a result, the image quality of many current camera modules is poor, and camera modules may even have to be rejected. In the state of the art, rejection is only decided after assembly, which means that the image sensor chip, which is relatively expensive, is lost.

It is an objective of the present invention to provide a method for positioning a lens assembly in a camera module, which is more accurate and which consequently leads to a higher yield of camera modules with good quality. In one aspect of the present invention, this objective is achieved with a method for assembling a camera module comprising a substrate, a lens and an image sensor chip having a light-sensitive surface, wherein in an assembled state an optical axis of the lens extends in a z-direction and the light-sensitive surface of the image sensor chip extends at a pre-determined sensor surface position perpendicular to the z-direction, the method comprising the following steps:
a) aligning a detector of a measuring device with the optical axis of the lens;
b) displacing the lens in the z-direction;
c) determining an optimal z-position for the lens on the basis of measuring signals from the measuring device, wherein measuring is performed at a measuring position;
d) bringing the lens to the optimal z-position, preferably fixing the lens with respect to the substrate;
e) removing the measuring device; and
f) placing the image sensor chip.

In the method according to the present invention, a measuring device is applied in order to determine the optimal z-position of the lens. While the lens is axially displaced, the measuring device generates measuring signals on the basis of which the optimal z-position is determined. After the lens has been brought to this optimal z-position, the measuring device is removed and the image sensor chip is attached to the substrate.

According to the present invention, the position of the lens assembly with respect to the substrate is determined in an accurate way, wherein the process of determination takes place on the basis of objective measurements. This is advantageous compared to the state of the art, wherein the process of determination merely takes place on the basis of human judgement.

Another advantageous feature of the method according to the present invention is that the image sensor chip is not needed in the process of determining the optimal z-position of the lens. In case of the measurements pointing out that the assembly of substrate and lens assembly is completely out of specification, and that it is impossible to position the lens assembly properly, the substrate and the lens assembly can be put away before the relatively expensive image sensor chip is attached to the substrate.

The present invention will now be explained in greater detail with reference to the Figures, in which similar parts are indicated by the same reference signs, and in which.

Figure 1:
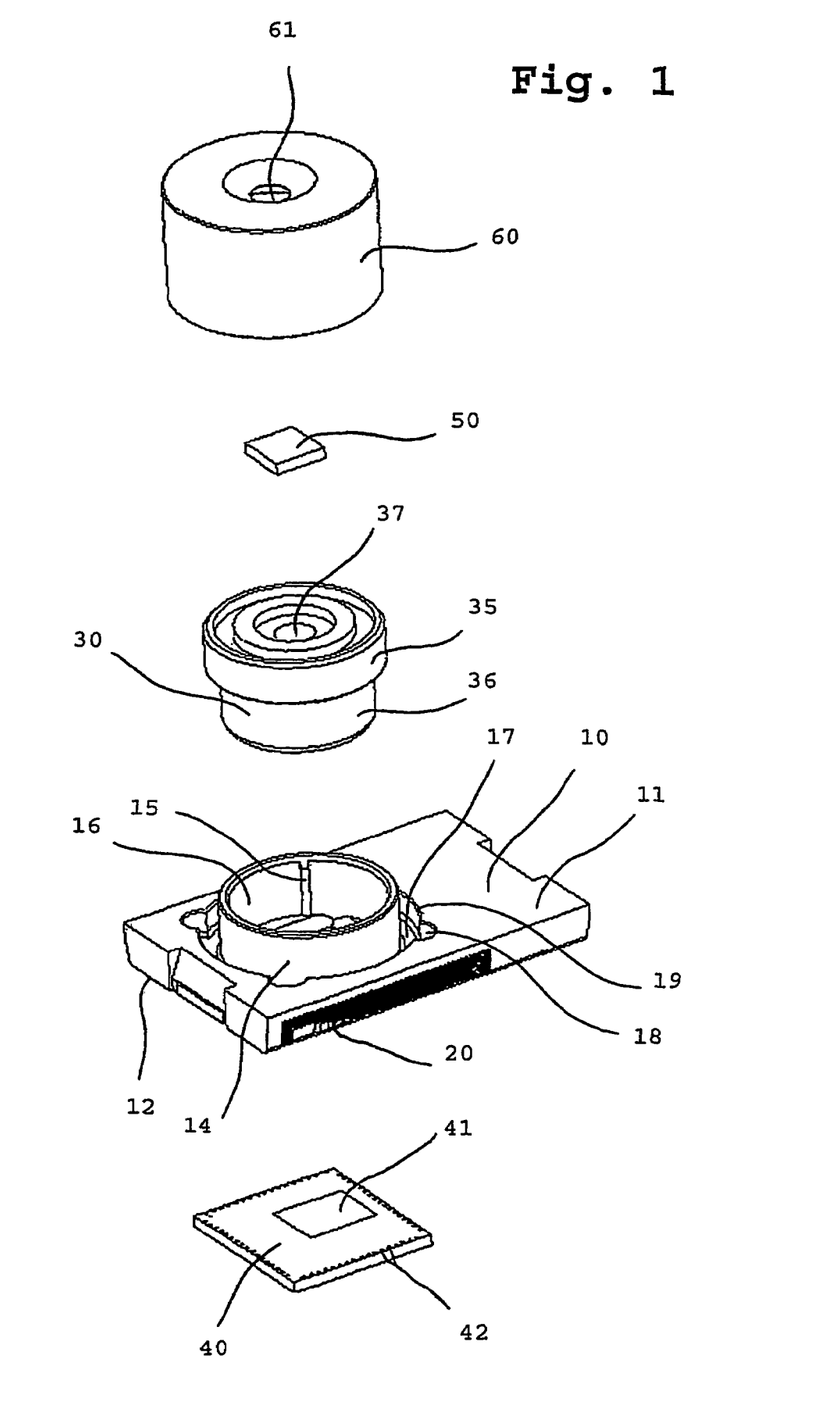
FIG. 1 is an exploded view of a camera module according to the present invention.
Figure 2:
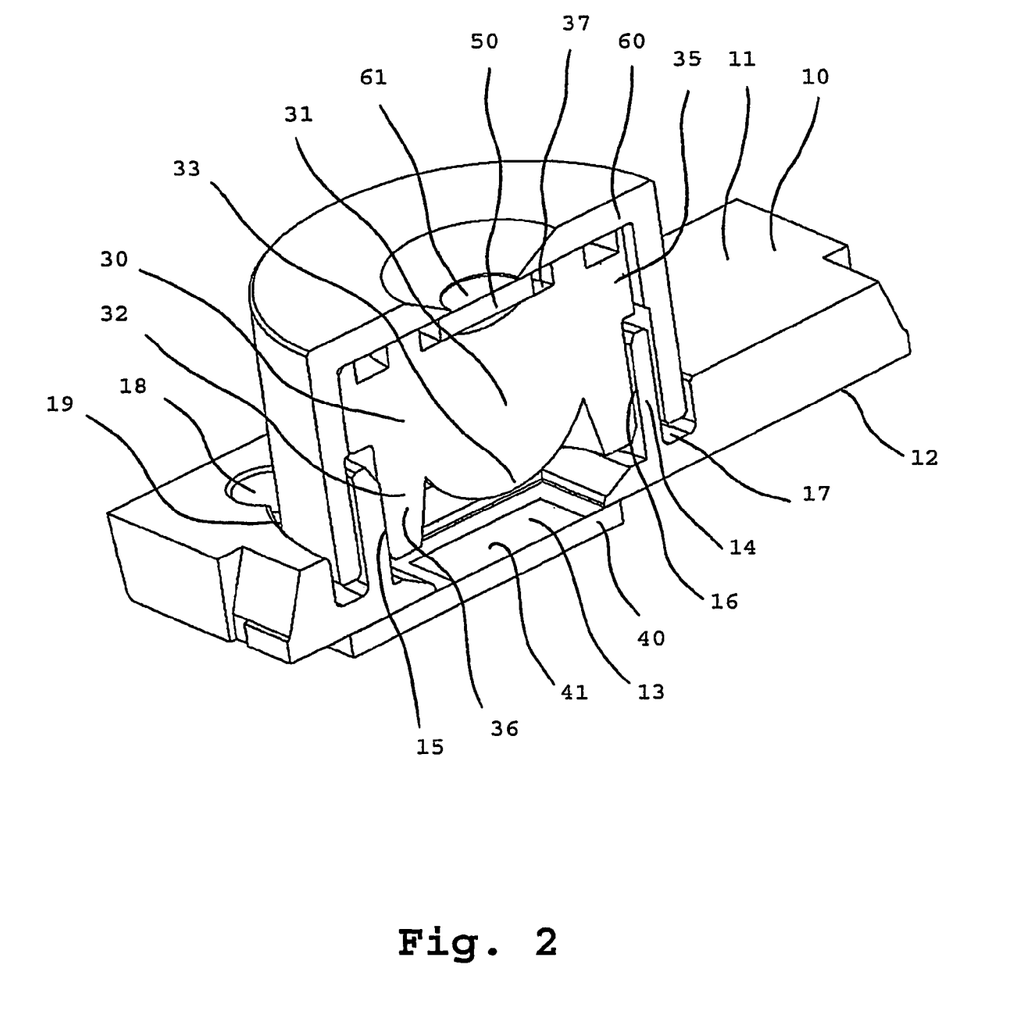
FIG. 2 is a partial sectional perspective view of the camera module as shown in FIG. 1 in an assembled state.

FIGS. 1 and 2 show camera elements of a camera module according to the present invention, wherein FIG. 2 shows the camera elements in an assembled state. The camera module comprises a substrate 10, a lens assembly 30, an image sensor chip 40, an infrared filter 50 and a cover 60. The infrared filter 50 is not an essential element of the camera module, and may therefore be left out.

In the following, the terms "up" and "under" and derived terms relate to an orientation of the camera elements 10, 30, 40, 50, 60 as shown in FIGS. 1 and 2. It will be understood that this definition is arbitrary, as the camera elements 10, 30, 40, 50, 60 may have a totally different orientation from the one as shown in FIGS. 1 and 2. This definition should therefore not be regarded as having a limiting effect on the scope of the present invention.

The substrate 10 has a top surface 11, a bottom surface 12 and a through hole 13. In the example shown, the top surface 11 and the bottom surface 12 extend substantially parallel to each other. The bottom surface 12 is designed for attaching the image sensor chip 40, with a light-sensitive surface 41 facing the substrate 10, and aligned with the hole 13. In the following, the position at the substrate 10 where the light-sensitive surface 41 will be in the assembled state is referred to as sensor surface position. In the example shown, the sensor surface position and the bottom surface 12 extend in the same plane.

In the assembled state of the camera module, the hole 13 has the function of letting rays of light pass onto the light-sensitive surface 41 of the image sensor chip 40. For this purpose, the dimensions of the hole 13 at least correspond to the dimensions of the light-sensitive surface 41. In the example as shown in FIG. 2, the dimensions of the hole 13 are somewhat larger than the dimensions of the light-sensitive surface 41.

The substrate 10 comprises a cylindrical receiving sleeve 14 for receiving the lens assembly 30, aligned with the hole 13 and extending perpendicular to the bottom surface 12. Consequently, a central axis of the receiving sleeve 14 extends in the z-direction. According to an important aspect of the present invention, the receiving sleeve 14 may be formed as an integral part of the substrate 10. The receiving sleeve 14 comprises a plurality of elongated ribs 15, preferably three, which are evenly distributed along an inner surface 16 of the receiving sleeve 14. The ribs 15 extend in the z-direction, from a lower side to an upper side of the receiving sleeve 14.

Extending around an outer perimeter of the receiving sleeve 14, an annular receiving groove 17 is provided in the top surface 11 of the substrate 10 for receiving a lower side of the cover 60. In the example shown, the receiving groove 17 comprises four bulges 18, which are evenly distributed along an outer circumference 19 of the receiving groove 17.

The substrate 10 is preferably made of glass-filled plastic material, but may comprise any suitable material.

Portions of the surface of the substrate 10 are covered with electric wires 20. In the assembled state of the camera module, the electric wires 20 are connected to contact points 42 of the image sensor chip 40, for example by means of a flip-chip bonding process.

In the assembled state of the camera module the image sensor chip 40 is attached to the bottom surface 12 of the substrate 10, for example by means of a bonding process. The image sensor chip 40 is positioned such that the light-sensitive surface 41 is aligned with the hole 13 in the substrate 10, so that the light-sensitive surface 41 may be reached by rays of light. The correct alignment in the x, y-directions of the image sensor chip 40 with respect to the substrate 10 may be established by means of for example a cavity in the bottom surface 12 and/or projections on the bottom surface 12, or on the basis of the connection of the contact points 42 to the electric wires 20, wherein the contact points 42 may be provided with bumps.

Figure 3:
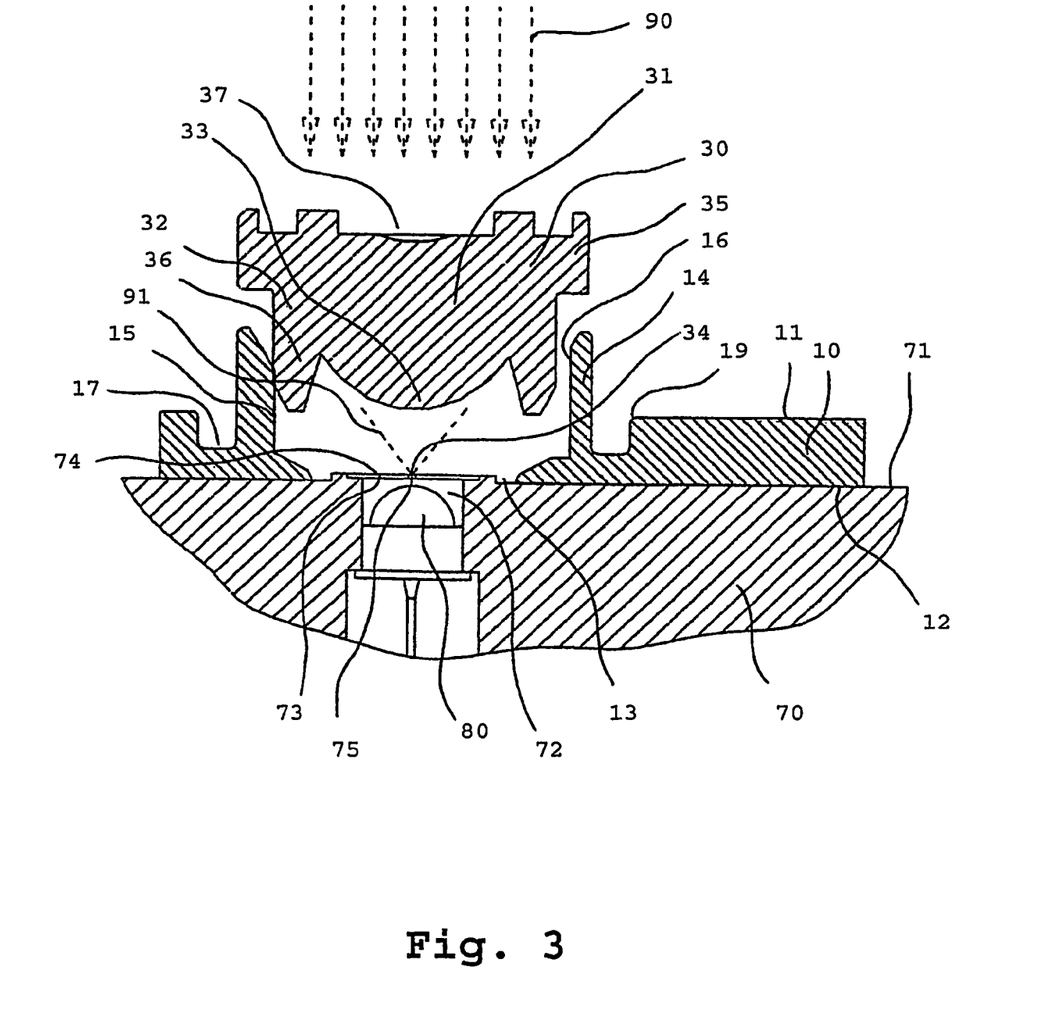
FIG. 3 is a partial sectional side view of a substrate, a lens assembly, a positioning die and a detector according to the present invention.

The lens assembly 30 is rotation-symmetrical and comprises a number of elements, namely a lens element 31 having a convex part, and a lens holder 32 surrounding the lens element 31. The convex part will hereinafter be referred to as convex lens 33. In FIG. 3, a focus of the convex lens 33 is diagrammatically shown and indicated by reference numeral 34.

The lens element 31 is made of a transparent material, such as transparent plastic. In the example shown, an outer diameter of an upper portion 35 of the lens holder 32 is larger than an outer diameter of a lower portion 36 of the lens holder 32.

Further, at a top side, the lens assembly 30 has a recess 37 for accommodating the optional infrared filter 50.

In the example shown, the lens element 31 and the lens holder 32 form one undivided whole, but this is not essential in the light of the present invention.

The cover 60 is shaped as a hollow cylinder wherein inner dimensions of the cover 60 are such that the cover 60 may encompass the lens assembly 30 and the receiving sleeve 14 of the substrate 10, in order to offer protection against stray light. In the assembled state of the camera module, a lower side of the cover 60 is in the receiving groove 17 in the substrate 10. The cover 60 may be attached to the substrate 10 by means of glueing, wherein glue droplets may be received by the bulges 18 of the receiving groove 17. At an upper side, the cover 60 comprises a hole 61 for letting pass rays of light onto the infrared filter 50 and the lens assembly 30.

According to an important aspect of the present invention, the lens assembly 30 is fit into the receiving sleeve 14 of the substrate 10 by means of press fitting. Therefore, the outer diameter of the lower portion 36 of the lens holder 32 is somewhat larger than a diameter of a virtual circle being determined by inner surfaces of the ribs 15 in the receiving sleeve 14. In order to secure the position of the lens assembly 30 with respect to the receiving sleeve 14, a ring of sealing material or a mold (epoxy) may be applied.

In the assembled camera module rays of light pass through the hole 61 in the upper side of the cover 60, through the infrared filter 50 (if present) and through the lens element 31. In the process, the rays of light are deflected by the convex lens 33, in such a way that the rays converge in the direction of the light-sensitive surface 41 of the image sensor chip 40. The rays of light reach the light-sensitive surface 41 by passing through the hole 13 in the substrate 10. When the light-sensitive surface 41 of the image sensor chip 40 is irradiated by rays of light, the image sensor chip 40 generates an electrical signal which is representative of the received rays of light. On the basis of this signal, an image can be displayed on a screen.

In order to obtain a sharp image, it is important for the convex lens 33 and the light-sensitive surface 41 of the image sensor chip 40 to be accurately positioned with respect to each other. The positioning of the convex lens 33 and the image sensor chip 40 has various aspects:

Alignment in a plane parallel to the light-sensitive surface 41 of the image sensor chip 40. A centre of the light-sensitive surface 41 and a centre of the convex lens 33 should be on the same axis.

Distance between the light-sensitive surface 41 of the image sensor chip 40 and the convex lens 33. This distance is important for optimum focus, wherein the light-sensitive surface 41 should be positioned at the focus 34 of the convex lens 33.

Angle between the light-sensitive surface 41 of the image sensor chip 40 and the optical axis of the convex lens 33. The light-sensitive surface 41 should extend perpendicular to the optical axis of the convex lens 33.

In the camera module according to the present invention, alignment in a plane parallel to the light-sensitive surface 41 of the image sensor chip 40 is better than in conventional camera modules. The reason for this is that in the camera module according to the present invention there is only one element between the image sensor chip 40 and the convex lens 33, as both the image sensor chip 40 and the convex lens 33 are directly connected to the substrate 10. The lens assembly 30 is fitted in the receiving sleeve 14 of the substrate 10 and supports the cover 60. The arrangement according to the present invention differs from the arrangement according to the state of the art, wherein at least two bodies are present between the image sensor chip 40 and the convex lens 33. In the conventional camera modules, the lens assembly 30 is supported by a separate carrier, which in turn is supported by the substrate 10. During assembly of a camera module, positioning of each element brings along its own attachment and alignment problems. Therefore it is true that the lower the number of intermediate elements, the higher the accuracy.

For the reasons as mentioned in the above paragraph, when a camera module is assembled from camera elements 10, 30, 40, 50, 60 according to the present invention, the accuracy of the camera module is higher than the accuracy of a conventional camera module. This is already true when assembling of the camera module and positioning of the convex lens 33 are performed in a conventional way, wherein the image sensor chip 40 is provided on the substrate 10 first, and wherein determination of the position of the convex lens 33 and the image sensor chip 40 is performed by using the image sensor chip 40 and judging the performance of the camera module on sight. However, the position of the convex lens 33 is preferably determined by applying a positioning method according to the present invention. This positioning method will be described in the following, wherein reference will be made to FIGS. 3 and 4.

FIG. 3 shows a positioning die 70 and a substrate 10 being supported by an upper surface 71 of the positioning die 70. For the purpose of positioning the substrate 10 in a predetermined manner, the positioning die 70 may for example comprise projections extending from the upper surface 71.

The positioning die 70 comprises a recess 72. At an upper side of the positioning die 70, the recess 72 is covered by a cover plate 73. The cover plate 73 comprises a spot hole 75, which is positioned on the central axis of the receiving sleeve 14. Preferably, the diameter of the spot hole 75 is of the order of the focal diameter or smaller, for example within a range from 20-30 µm. Right underneath the cover plate 73, inside the recess 72, a light sensor 80 is arranged for detecting the intensity of light passing through the spot hole 75.

A method for positioning the lens assembly 30 with respect to the substrate 10 is as follows. The lens assembly 30 is placed in the receiving sleeve 14 of the substrate 10, and is moved in the direction of the substrate 10. Preferably, the lens assembly 30 is moved in axial steps, wherein the steps may have a value of 1 µm, for example. In the process, the lens assembly 30 is irradiated with a beam of light containing rays which extend substantially parallel to each other and to the optical axis of the convex lens 33, in other words, perpendicular to the bottom surface 12 of the substrate 10 (or the upper surface 71 of the positioning die 70). In FIG. 3, the parallel rays of light are diagrammatically depicted by means of dashed arrows and indicated by reference numeral 90.

It is known that a convex lens 33 deflects parallel rays of light 90 towards its focus 34. In FIG. 3, the deflected paths of the outer parallel rays are depicted by means of dashed lines and indicated by means of reference numeral 91. When the movement of the lens assembly 30 in the direction of the substrate 10 is started, the focus 34 of the convex lens 33 is above the cover plate 73 and the spot hole 75, and a projection of the deflected beam of light on an upper surface 74 of the cover plate 73 has the shape of a circular disc. When the lens assembly 30 moves closer, the light spot gets smaller and smaller, hence the light intensity as received by the light sensor 80 increases. The maximum light intensity is achieved when the focus 34 of the convex lens 33 coincides with the upper surface 74 of the cover plate 73. Starting from that point, when the lens assembly 30 still moves in the direction of the substrate 10, the light spot gets bigger again, and the light intensity as received by the light sensor 80 decreases.

Each time the lens assembly 30 has moved one step, the light sensor 80 detects the light intensity of the beam of light at the spot hole 75. When a comparison of the currently detected light intensity with a previously detected light intensity shows that the currently detected light intensity is higher than the previously detected light intensity, the stepped movement of the lens assembly 30 is continued. When a comparison of the currently detected light intensity with the previously detected light intensity shows that the currently detected light intensity is lower than the previously detected light intensity, it is known that the focus 34 has passed the spot hole 75. From that point on, it is not necessary to collect any further measuring results. By extrapolating the available measuring results, the position of the lens assembly 30 at which the light intensity was at a maximum can be determined. In the following, this position will be referred to as reference lens position. When the lens assembly 30 is at the reference lens position, the upper surface 74 of the cover plate 73 is at the focus 34 of the convex lens 33.

Figure 4:
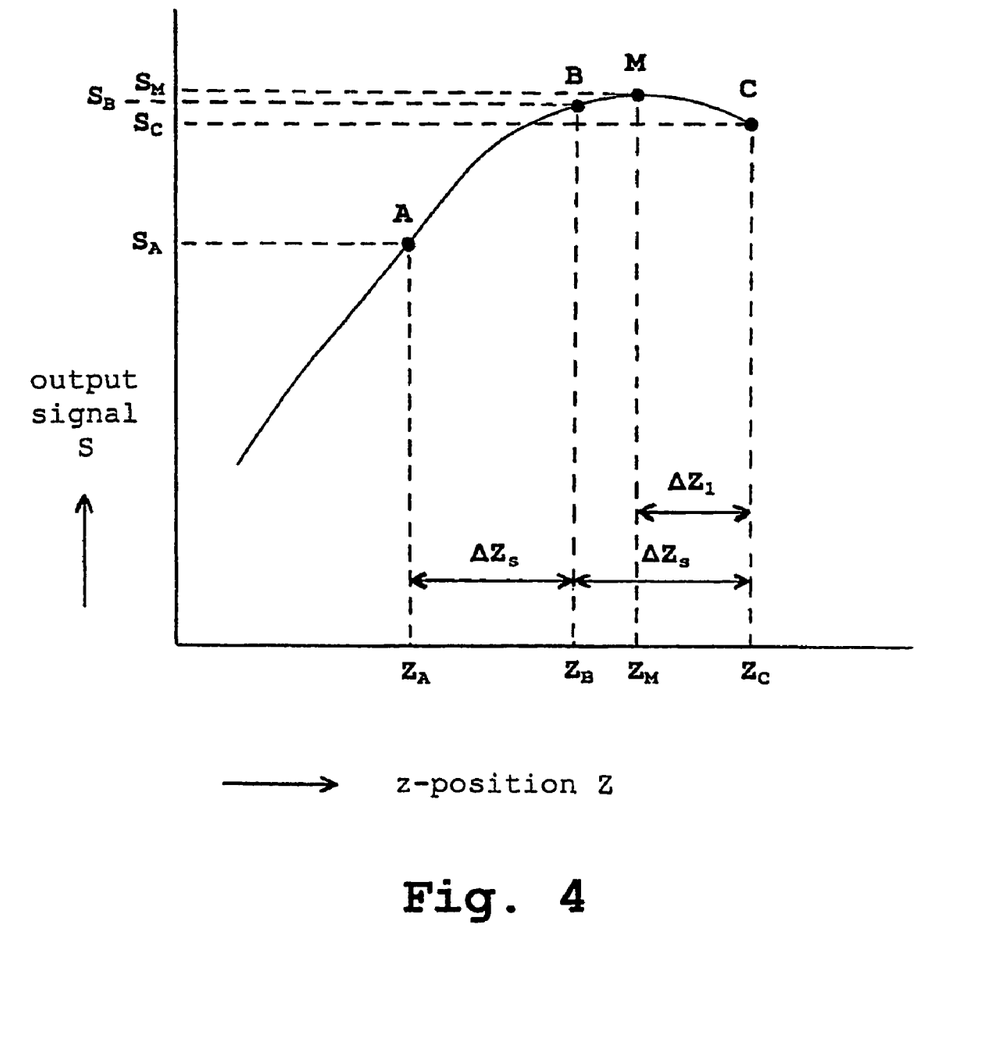
FIG. 4 is a graphical drawing depicting a relation between a measured light intensity and a z-position of a lens.

FIG. 4 is a graph illustrating an output signal S of the light sensor 80 as a function of the z-position Z of the lens assembly 30. In order to illustrate a way of finding the reference lens position, three subsequent measurement points A, B and C are depicted in the graph. A difference $\Delta Z_s$ between z-positions corresponding to subsequent measurement points is representative of the size of the steps in the displacement of the lens assembly 30.

When an output signal $S_B$ of measurement point B is compared to an output signal $S_A$ of previous measurement point A, it is found that the value of output signal $S_B$ is higher than the value of output signal $S_A$. On the basis of this outcome, the displacement of the lens assembly 30 is continued, and a new measurement is performed, which yields measuring point C. When an output signal $S_C$ of measurement point C is compared to the output signal $S_B$ of previous measurement point B, it is found that the value of output signal $S_C$ is lower than the value of output signal $S_B$. On the basis of this outcome, the movement of the lens assembly 30 is stopped, as it is now known that a maximum value of the output signal S is at a point M between measuring points B and C. This point M may for example be determined by means of extrapolation. A z-position $Z_M$ which is associated with the point M is representative of the reference lens position.

In order for the camera module to perform properly, the light-sensitive surface 41 of the image sensor chip 40 has to coincide with the focus 34 of the convex lens 33. As soon as the reference lens position is determined on the basis of the measurements being performed with the help of the light sensor 80, the optimal z-position of the lens assembly 30 can be determined. In the example shown, the level of the upper surface 71 of the positioning die 70 equals the level of the bottom surface 12 of the substrate 10 and consequently, the level of the sensor surface position. Therefore, a distance between the reference lens position and the optimal lens position equals a distance between the level of the upper surface 71 of the positioning die 70 and the level of the upper surface 74 of the cover plate 73. As the latter is known, the optimal lens position may easily be determined, starting from the reference lens position.

In the example shown, the level of the upper surface 71 of the positioning die 70 is lower than the level of the upper surface 74 of the cover plate 73. Advantageously, a distance between these two levels is larger than a distance between the reference lens position and the position of the lens assembly 30 where the last measurement was performed. The movement of the lens assembly 30 in the direction of the substrate 10 can then be continued until the lens assembly 30 reaches the optimal lens position.

In order to determine the value of a distance still to be covered by the lens assembly 30, starting from the position where the last measurement was taken, all that is needed is a comparison of a distance between this position and the reference lens position with the distance between the optimal lens position and the reference lens position. The difference between the two distances equals the distance still to be covered by the lens assembly 30. Referring to the graph as shown in FIG. 4, the z-position where the last measurement was taken is represented by a z-position $Z_C$ corresponding to measurement point C. The distance between this position and the reference lens position is represented by a distance $\Delta Z_1$ between z-positions $Z_M$ and $Z_C$.

After the lens assembly 30 has been positioned according to the above-described method, the substrate 10 and the lens assembly 30 are taken off the positioning die 70, and the image sensor chip 40 can be attached to the bottom surface 12 of the substrate 10. Also, the optional infrared filter 50 and the cover 60 can be put in place.

In carrying out the positioning method according to the present invention, many details may be different from the ones described in connection to the above example.

Carrying out the positioning method as described in the above is advantageous in case of the lens assembly 30 being press-fitted in the receiving sleeve 14. In such a case, the lens assembly 30 can only be moved in a direction towards the substrate 10. Moving the lens assembly 30 in the opposite direction would cause the lens assembly 30 to be loose. Therefore, in such a case, it is important for the optimal lens position to be closer to the substrate 10 than the reference lens position, in other words, it is important that the spot hole 75 be positioned above the position where the light-sensitive surface 41 of the image sensor chip 40 will be at a later stage.

Nevertheless, the positioning method according to the present invention also relates to cases where the lens assembly 30 can be moved in both directions inside the receiving sleeve 14 without losing grip, for example cases where the lens assembly 30 has external screw thread and the receiving sleeve 14 has internal screw thread. In such cases, it is no problem if the lens assembly 30 has moved beyond the optimal lens position, seen in a direction towards the substrate 10. Therefore, the reference lens position and the optimal lens position may coincide. Consequently, the position of the spot hole 75 and the position where the light-sensitive surface 41 of the image sensor chip 40 will be at a later stage may coincide. In theory, the reference lens position may even be closer to the substrate 10 than the optimal lens position.

Throughout the process of positioning the lens assembly 30, the optional infrared filter 50 and the cover 60 may already be placed at the right position with respect to the lens assembly 30.

It is not essential that the lens assembly 30 is moved in discrete steps. The lens assembly 30 may as well be moved continuously. In such a case, the measurements may still be performed at discrete time intervals.

The measurement results may also be used for determining whether a lens assembly 30 satisfies the requirements relating to the maximum value of the light intensity. In the process, the actual value of the light intensity at the reference lens position is compared to a tolerable range of values. If the actual value does not meet the requirements, there may be an error in the lens assembly 30, the substrate 10 or another element. In this way, such an error is found before the image sensor chip 40 is attached to the substrate 10, and loss of the image sensor chip 40 is prohibited.

The optical performance of camera modules in which the lens assembly 30 has been positioned by applying the positioning method according to the present invention is very good. Besides the accuracy of the positions of the camera elements 10, 30, 40, 50, 60, the resolution of the image sensor chip 40 plays a role in the optical performance of the camera module. Therefore, the positioning method according to the present invention may be applied for the purpose of being able to use an image sensor chip 40 with less resolution and/or to perform less digital processing, instead of the purpose of obtaining a better image quality. This is a very interesting aspect in the light of an application of the camera module in for example mobile phones, wherein it is desirable to limit the information size of an image.

Figure 5:
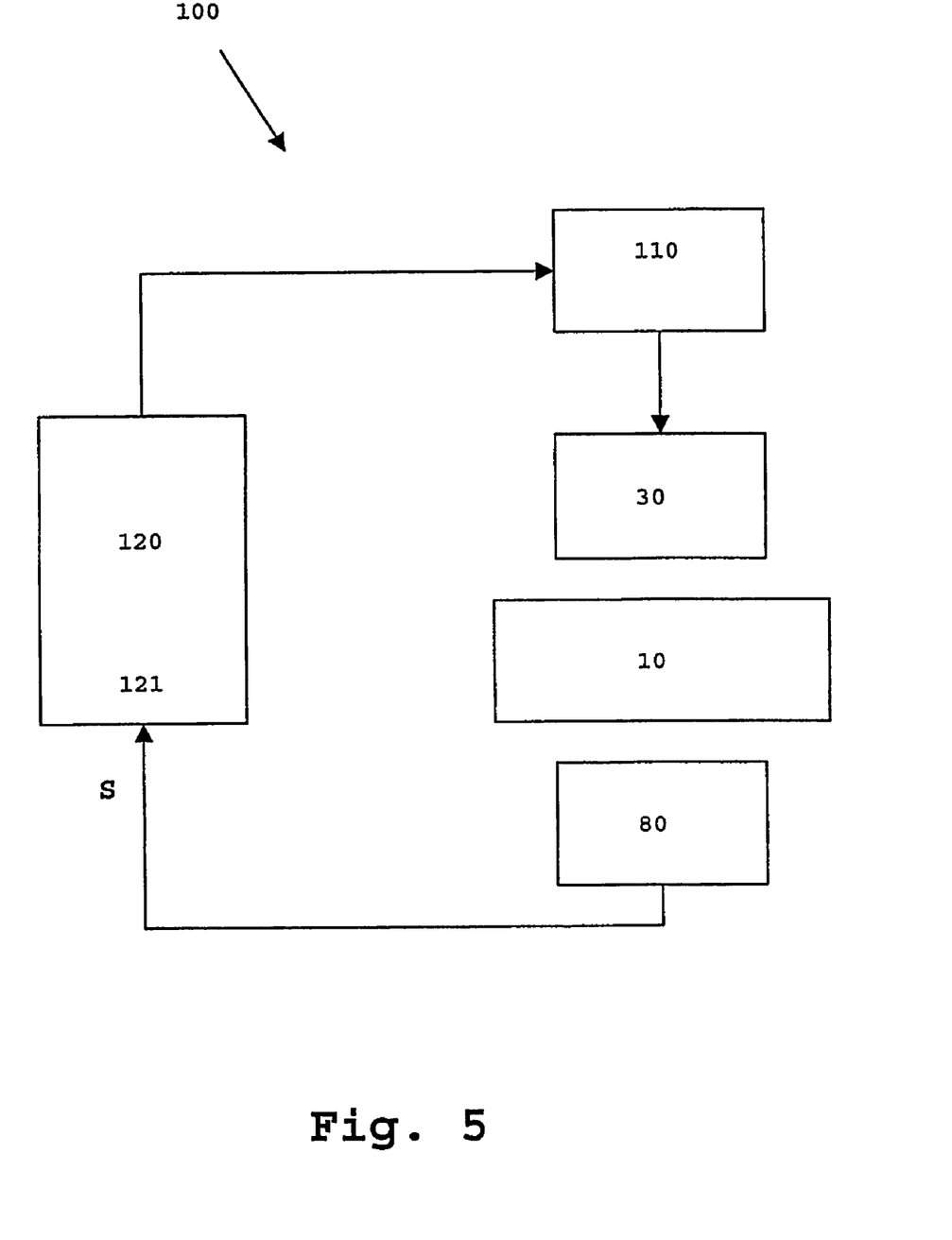
FIG. 5 is a block diagram of a positioning apparatus.

FIG. 5 is a block diagram schematically illustrating a positioning apparatus 100 for positioning the lens assembly 30 with respect to the substrate 10. A controllable manipulator 110, capable of displacing the lens assembly 30, is controlled by a controller 120, which receives the output signal S at an input 121. As long as the value of S increases, the controller 120 continues to activate the manipulator 110.

It is possible to stop the manipulator 110 as soon as the controller 120 finds that a maximum $S_M$ is achieved. A higher accuracy is possible if the manipulator is activated to continue the displacement of the lens assembly 30 beyond the point M corresponding to the reference lens position and the maximum $S_M$. On the basis of the measured curve representing the relation between S and Z, the controller 120 is able to calculate the reference lens position $Z_M$.

In the previous examples, the position where the measurements are performed is above the sensor surface position, at a pre-determined distance $\Delta Z_2$. When the lens assembly 30 is moved beyond the reference lens position over a distance $\Delta Z_1$, the lens assembly 30 can be moved on to the optimal lens position. The distance which needs to be covered, can be accurately determined, as this distance exactly equals the difference between $\Delta Z_2$ and $\Delta Z_1$. During the positioning process, the controller 120 first determines the reference lens position on the basis of the measuring results. Once this reference lens position is found, the distance $\Delta Z_1$ is calculated by comparing an actual z-position with the reference lens position. Subsequently, on the basis of the known distance $\Delta Z_2$, the controller 120 is able to calculate the distance over which the lens assembly 30 has to be moved in order to arrive at the optimal lens position, and to activate the manipulator 110 in order to actually position the lens assembly 30 at the optimal lens position.

In a possible embodiment, the controller 120 activates the manipulator 110 in opposite sense if it is necessary to move the lens assembly 30 away from the substrate 10 in order to reach the optimal lens position. This is possible in cases where the manipulator 110 is capable of pulling back, for example in cases where screw mounts are applied. In case of the lens assembly 30 being press fitted with respect to the substrate 10, pulling back is not an option, as pulling back will cause the lens assembly 30 to be loose in the substrate 10.

It will be clear to a person skilled in the art that the scope of the present invention is not limited to the examples discussed in the foregoing, but that several amendments and modifications thereof are possible without deviating from the scope of the invention as defined in the attached claims.

For example, although it is only shown that the receiving sleeve 14 comprises ribs 15, it may as well be that the lens assembly 30 comprises ribs 15. It is even possible that both the receiving sleeve 14 and the lens assembly 30 comprise ribs 15.

Further, although this is not explicitly disclosed in the above, the cover plate 73 may be formed as an integral part of the positioning die 70.

In the context of the present invention, it is not essential that the positioning process of the convex lens 33 is started with the lens assembly 30 in a position in which the focus 34 of the convex lens 33 is above the upper surface 74 of the cover plate 73, and that the convex lens 33 is moved towards the substrate 10. It is also possible that an initial position of the lens assembly 30 is such that the focus 34 of the convex lens 33 is below the upper surface 74 of the cover plate 73, wherein the reference lens position is found by moving the lens assembly 30 away from the substrate 10.

In all described examples, it has been disclosed that during the positioning process, only the lens assembly 30 is moved. This is not essential; it is important that the lens assembly 30 and the substrate 10 be moved relative to each other. Therefore, it is also possible that only the substrate 10 is moved, or that both the lens assembly 30 and the substrate 10 are moved.

In the foregoing, a positioning method is disclosed, wherein the optimal z-position of a convex lens 33 with respect to a substrate 10 is accurately determined by measuring the light intensity of a light beam being obtained from a bundle of parallel rays of light 90 which have passed the convex lens 33. A focus 34 of the convex lens 33 is found with the benefit of the knowledge that at the focus 34, the light intensity of the light beam is at a maximum. As it is difficult to determine the maximum without having passed it, moving the convex lens 33 towards the substrate 10 and measuring the light intensity are continued until the light intensity appears to decrease again. Then, the position of the convex lens 33 which corresponds to the maximum can be calculated relatively easily. At this position, the focus 34 of the convex lens 33 is at an area 74 where the light intensity is measured. Starting from the sensor surface position, the optimal position of the convex lens 33 may be determined in an accurate manner by taking into account the fact that the light-sensitive surface 41 of the image sensor chip 40 has to be at the focus 34 of the convex lens 33. Depending on the position of the area 74 where the measurements have taken place with respect to the sensor surface position, the convex lens 33 needs to be moved away from the substrate 10 or towards the substrate 10 in order to take it to the optimal position. Also, in the foregoing, a method for assembling a camera module is disclosed, the method comprising the following steps:

placing the substrate 10 on a positioning die 70;
irradiating the lens assembly 30 with parallel rays of light 90;
displacing a lens assembly 30 comprising the convex lens 33 in an axial direction;
measuring the light intensity of light passing through a spot hole 75 by means of a light sensor 80 being accommodated in the positioning die 70;
determining an optimal axial position of the lens assembly 30 on the basis of an obtained light intensity curve;
bringing the lens assembly 30 to the optimal axial position;
removing the positioning die 70; and
attaching an image sensor chip 40 to a bottom surface 12 of the substrate 10.

The invention claimed is:

1. Method for assembling a camera module comprising a substrate, a lens and an image sensor chip having a light-sensitive surface, wherein in an assembled state an optical axis of the lens extends in a z-direction and the light-sensitive surface of the image sensor chip extends at a pre-determined sensor surface position perpendicular to the z-direction, the method comprising the following steps:
   a) aligning a detector of a measuring device with the optical axis of the lens;
   b) displacing the lens in the z-direction;
   c) determining an optimal z-position for the lens on the basis of measuring signals from the measuring device, wherein measuring is performed at a measuring position;
   d) bringing the lens to the optimal z-position, and fixing the lens with respect to the substrate;
   e) removing the measuring device; and
   f) attaching the image sensor chip to the substrate, wherein the measuring device is removed before the image sensor chip is attached to the substrate, so as to align the light-sensitive surface of the image sensor chip with the optical axis of the lens.

2. Method according to claim 1, wherein the measuring device is positioned at a bottom surface of the substrate.

3. Method according to claim 1, wherein the measuring device comprises a diaphragm opening aligned with the optical axis of the lens, and a light sensor receiving all light passing through the diaphragm opening, and wherein step c) comprises the step of determining the light intensity detected by the light sensor as a function of the lens position.

4. Method according to claim 1, further comprising the step of determining a maximum light intensity.

5. Method according to claim 1, wherein the measuring position coincides with the sensor surface position, and wherein the displacement of the lens is stopped as soon as the optimal z-position is reached.

6. Method according to claim 4, wherein the measuring position coincides with the sensor surface position, wherein displacement of the lens is continued after having reached the optimal z-position, wherein step c) comprises the step of calculating a distance between the present z-position and the optimal z-position, and wherein step d) comprises the step of displacing the lens in an opposite direction over the calculated distance.

7. Method according to claim 4, wherein the measuring position is above the sensor surface position, at a pre-determined distance $\Delta Z_2$, wherein displacement of the lens is continued after having reached a reference z-position at which the measuring signals have a maximum value, wherein step c) comprises the step of calculating a distance $\Delta Z_1$ between the present z-position and the reference z-position, and wherein step d) comprises the step of displacing the lens over a distance $\Delta Z_2 - \Delta Z_1$.

8. Method according to claim 1, wherein the displacement of the lens takes place step by step.

9. Method according to claim 8, wherein the measuring position is at a pre-determined distance $\Delta Z_2$ from the sensor surface position, and wherein the predetermined distance $\Delta Z_2$ is larger than one step of the displacement of the lens.

10. Method, preferably according to claim 1, wherein a lens assembly having a lens is press-fitted in a mount, which is fixedly attached to a substrate or an integral part thereof, the method comprising the step of pushing the lens assembly into the mount until the lens has reached a desired position.

* * * * *